J. H. BOGE.
LAWN EDGER.
APPLICATION FILED APR. 6, 1915.
1,163,882.
Patented Dec. 14, 1915.
2 SHEETS—SHEET 1.
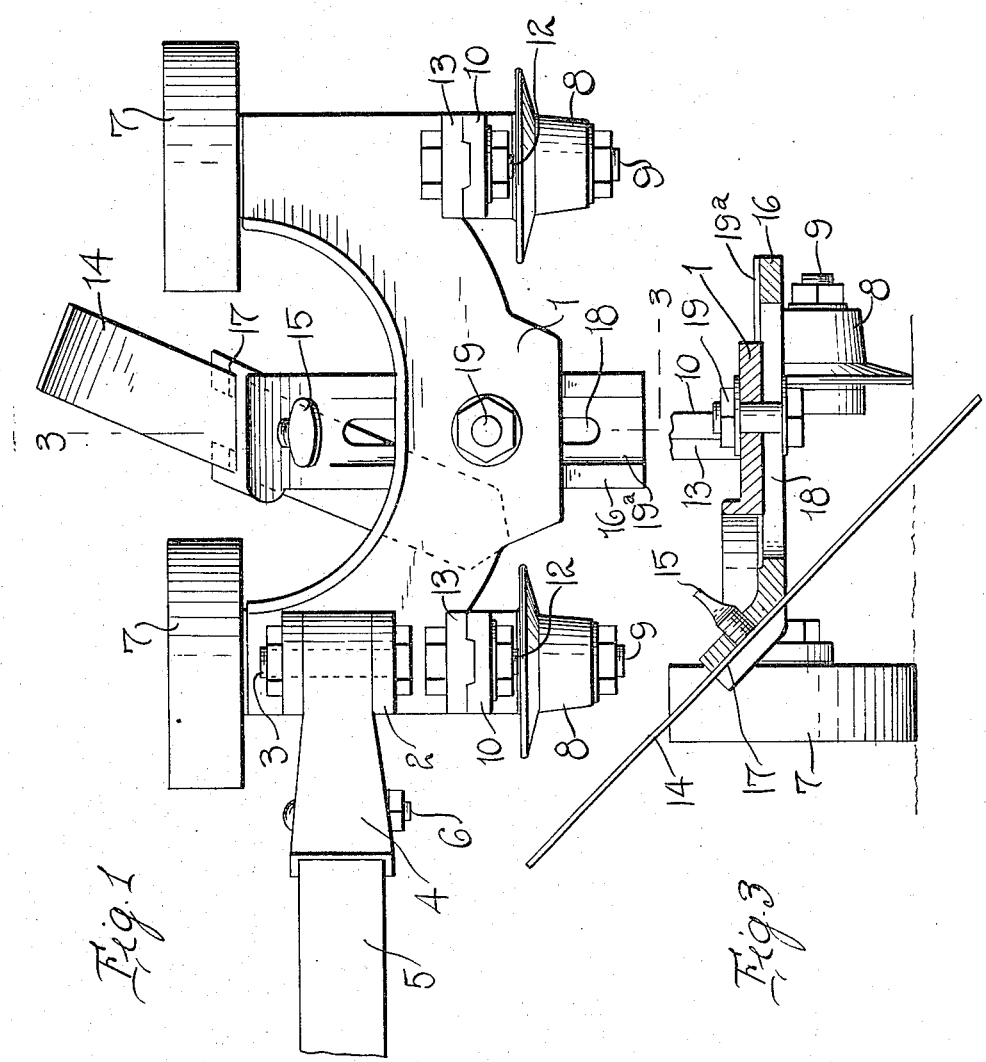
Inventor
J.H. BOGE
By Watson E. Coleman
Attorney

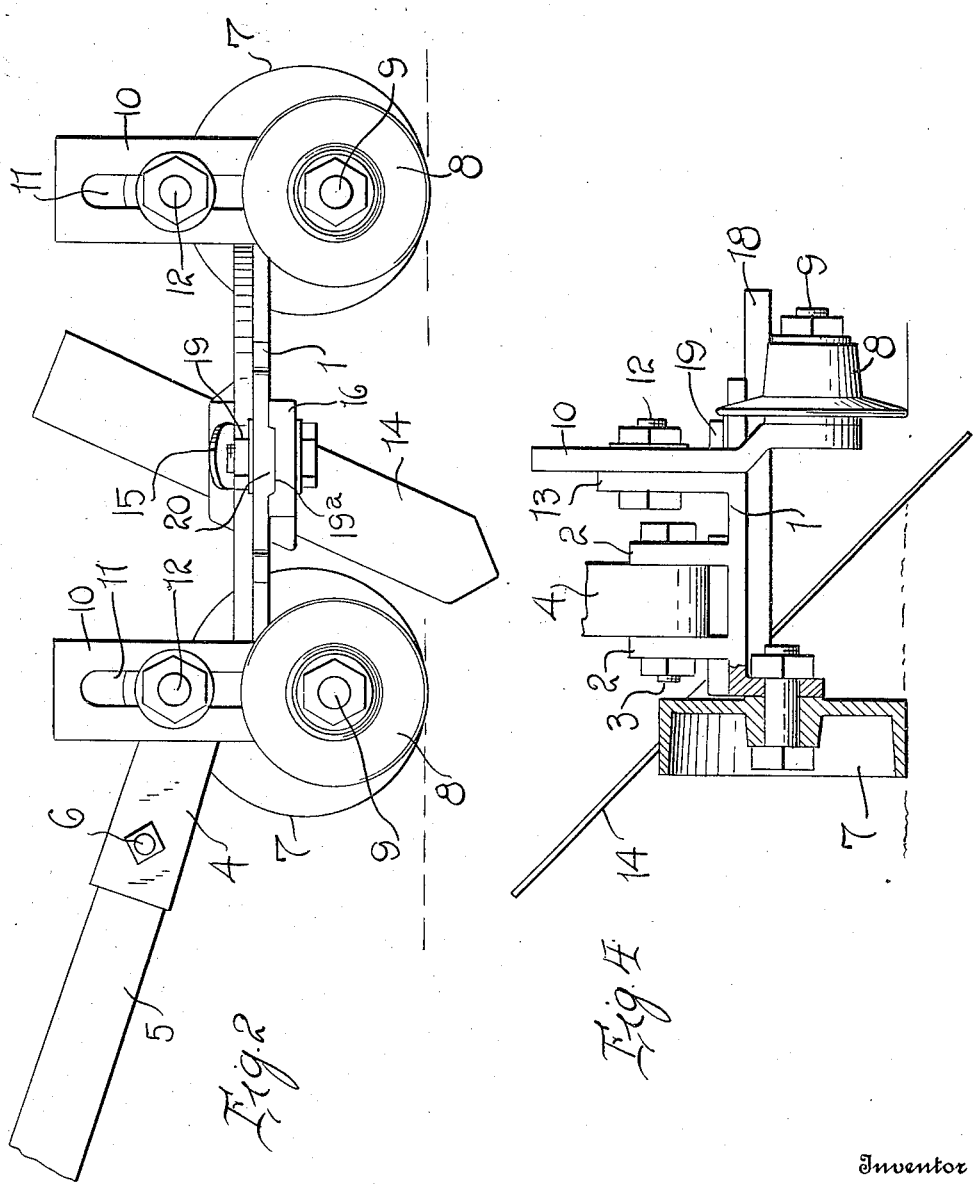

UNITED STATES PATENT OFFICE.

JOHN H. BOGE, OF DENVER, COLORADO.

LAWN-EDGER.

1,163,882.  Specification of Letters Patent.  Patented Dec. 14, 1915.

Application filed April 6, 1915. Serial No. 19,522.

*To all whom it may concern:*

Be it known that I, JOHN H. BOGE, a citizen of the United States, residing at Denver, in the county of Denver and State of Colorado, have invented certain new and useful Improvements in Lawn-Edgers, of which the following is a specification, reference being had to the accompanying drawings.
This invention comprehends certain new and useful improvements in lawn edging devices, and relates particularly to a device of this kind designed to cut a groove or channel adjoining the walks around a lawn.
The invention has for its primary object a simple, durable and efficient construction of device of this kind, wherein the parts are so arranged that the knife or grass trimming blade may be adjusted laterally as well as vertically, as required, and whereby the ground or traveling wheels that are adapted to roll along the sidewalk or the like, can be vertically adjusted, as the requirements of the case may demand.
A further object of the invention is an efficient device of this character which is so constructed and arranged, that a groove or channel may be expeditiously and easily cut and which groove or channel will be symmetrical in shape, means being provided whereby the grass cutting knife or blade may be reversed and removed for the purposes of sharpening in case it is damaged. And the invention also aims to generally improve devices of this kind so as to render them more useful and commercially desirable.

With these and other objects in view, as will more fully appear as the description proceeds, the invention consists in certain constructions, arrangements and combinations of the parts that I shall hereinafter fully describe and claim.

For a full understanding of the invention, reference is to be had to the following description and accompanying drawing, in which—

Figure 1 is a top plan view of a lawn edging device constructed in accordance with my invention. Fig. 2 (Sheet 2) is a side elevation thereof. Fig. 3 (Sheet 1) is a transverse sectional view on the line 3—3 of Fig. 1. Fig. 4 (Sheet 2) is a rear end view, one of the rear traveling or ground wheels being shown in section.

Corresponding and like parts are referred to in the following description and designated in all of the views of the accompanying drawing by like reference characters.

Referring to the drawings, the numeral 1 designates the body portion of the carriage of my improved lawn edger, said carriage being preferably in the form of a casting at the rear end of which are upwardly projecting apertured ears 2 designed to receive a bolt 3 for pivotally holding the socket member 4 that is designed to receive a handle 5 of wood or any other desired substance or material, a bolt 6 in the present instance, passing through the socket member and handle to secure the latter in place. It will, of course, be understood that the handle may be provided at its upper or rear end with any desired form of hand grip. The body portion 1 of the carriage of my device is mounted upon relatively large ground or traveling wheels 7 that are adapted to roll upon the lawn to be trimmed and that are disposed to the left of the device looking forward from the rear; and also supporting the body portion 1 of the carriage are relatively small ground or traveling wheels 8 that are journaled on stub axles 9 carried by vertically disposed bars 10. These bars are formed with vertically elongated slots 11, as shown, and bolts or similar fastening devices 12 are received in said slots and are secured to upwardly projecting apertured ears 13 that are formed on the casting or the like of which the body portion 1 of the carriage is composed. Thus it will be understood that the wheels 8 may be raised or lowered, as required.

The trimming blade 14 is secured by a set-screw 15 in the laterally and upwardly extending end of a tool holder which is in the form of the bar 16, said end being preferably formed with an undercut recess 17 to accommodate the blade. Thus it will be seen that the blade is held at a laterally inclined oblique angle, as best illustrated in Fig. 4, this angle being preferably an angle of 45° when the treads or flanges of the wheels 7 and 8 are on a level with each other, and it will be at once apparent that the angle of the blade may be varied or changed by raising or lowering the wheel carrying slide bars 10, hereinbefore referred to.

In order to laterally adjust the blade holder 16, it is formed with a laterally elongated slot 18 which accommodates a set screw 19 or similar fastening device extending through the body portion 1 of the carriage, and to assist in holding the blade holder 16 in proper position, the same is formed with a groove 19ª extending longitudinally thereof and in a direction laterally of the carriage, said groove receiving a boss or thickened portion 20 formed on the lower surface of the carriage itself. Thus it will be seen that by loosening the fastening device 19, the blade holder or bar 16 may be adjusted laterally so as to hold the blade or cutter 14 in the desired position, according to the path of movement of the carriage.

From the foregoing description in connection with the accompanying drawings, the operation of my improved lawn edger will be apparent. In the practical use of the device, the wheels 7 travel along the lawn and the wheels 8 upon the sidewalk where a channel or grove is to be cut around the lawn adjoining said walk, and the wheel carrying bars 10 are adjusted vertically, as required, according to the inclination it is desired the blade or cutting knife shall have. As the device is pushed along the lawn by the operator grasping the handle 5, it is obvious that the blade or knife 14 will trim the edge of the lawn, the knife being held at the required position, laterally considered, by the required adjustment of the holder or bar 16.

It is to be understood that the knife blade 14 is reversible and of course, it is also removable, as it is at once manifest, so that it may be easily detached from its holder and sharpened or replaced if it should become broken.

It will thus be seen that I have provided a very durable and efficient construction of lawn edging device, the parts of which may be easily manufactured and readily assembled and not liable to get out of order, and that the device will work expeditiously to cut the desired groove or channel of symmetrical shape in the lawn, the sidewalk wheels being susceptible of vertical adjustment whereby the device is adapted for any condition of lawn with relation to the sidewalk.

While the accompanying drawing illustrates what I believe to be the preferred embodiment of my invention, it is to be understood that the invention is not limited thereto, but that various changes may be made in the construction, arrangement and proportions of the parts without departing from the scope of the invention as defined in the appended claims.

What I claim is:

1. A lawn edging device, including a carriage comprising a body portion formed at front and rear and at one side thereof with upwardly projecting ears, bolts extending through said ears, vertically disposed slotted bars engaging said ears and accommodating said bolts whereby the bars may be adjusted vertically, relatively small ground wheels carried by said bars to support the carriage on one side, relatively large ground wheels journaled on the other side of the body portion, a transversely extending horizontally disposed bar formed with a longitudinal slot, a bolt passing through the carriage at the middle thereof and received in said slot whereby the bar may be adjusted laterally, the bar being provided with a laterally and upwardly inclined end having a recess formed therein, a knife mounted in said recess and disposed in an oblique position, and a set screw adapted to hold the knife adjustably connected to said bar.

2. A lawn edging device including an arcuate body portion, wheels supporting the body portion, a knife supporting arm removably mounted on the body portion for lateral adjustment with respect thereto, a knife receiving socket formed on the outer end of the bar, a knife vertically and adjustably mounted in the socket, said socket being disposed within the limits of the curved portion of the body member, and means for securing the bars in adjusted position.

In testimony whereof I hereunto affix my signature in the presence of two witnesses.

JOHN H. BOGE.

Witnesses:
EDWARD P. COSTIGAN,
HELEN C. HOFFMASTER.

Copies of this patent may be obtained for five cents each, by addressing the "Commissioner of Patents, Washington, D. C."